United States Patent
Lin et al.

(10) Patent No.: US 10,289,224 B2
(45) Date of Patent: May 14, 2019

(54) PRESSURE SENSING DISPLAY AND MANUFACTURING METHOD THEREOF

(71) Applicant: InnoLux Corporation, Miao-Li County (TW)

(72) Inventors: Shun-Mao Lin, Miao-Li County (TW); Po-Yang Chen, Miao-Li County (TW); I-An Yao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/416,454

(22) Filed: Jan. 26, 2017

(65) Prior Publication Data
US 2017/0228075 A1    Aug. 10, 2017

(30) Foreign Application Priority Data

Feb. 5, 2016 (TW) .............................. 105104125 A

(51) Int. Cl.
*G06F 3/041* (2006.01)
*G06F 3/044* (2006.01)

(52) U.S. Cl.
CPC ............ *G06F 3/0412* (2013.01); *G06F 3/041* (2013.01); *G06F 3/044* (2013.01); *G06F 3/0414* (2013.01);
(Continued)

(58) Field of Classification Search
CPC ................... G06F 3/0412; G06F 3/044; G06F 2203/04103; G06F 2203/04105;
(Continued)

(56) References Cited

U.S. PATENT DOCUMENTS

2014/0085254 A1*  3/2014  Tenuta .................. G06F 3/0414
                                                    345/174
2016/0170543 A1*  6/2016  Kawamura ......... G06F 3/03547
                                                    345/174
(Continued)

FOREIGN PATENT DOCUMENTS

CN        104897317 A   *   9/2015
CN        204808275 U       11/2015
(Continued)

OTHER PUBLICATIONS

Shinya et al. Development of "Super View Resin," the Optical Elasticity Resin for LCD Module. SID 08 Digest, 2008. ISSN/008-0966X/08/3901-0252.*

*Primary Examiner* — Julie Anne Watko
(74) *Attorney, Agent, or Firm* — Muncy, Geissler, Olds & Lowe, P.C.

(57) ABSTRACT

A pressure sensing display includes a first substrate, a thin film transistor (TFT) array, a first sensing element, a second sensing element and a compressible layer. The first substrate has a first surface and a second surface, and the first surface is opposite to the second surface. The TFT array is disposed on the first surface. The first sensing element is disposed on the second surface. The second sensing element is disposed opposite to the first sensing element. The compressible layer is disposed between the first sensing element and the second sensing element. A manufacturing method of the pressure sensing display is also disclosed.

19 Claims, 5 Drawing Sheets

(52) U.S. Cl.
CPC .............. *G06F 2203/04103* (2013.01); *G06F 2203/04105* (2013.01); *G06F 2203/04106* (2013.01)

(58) Field of Classification Search
CPC ................... G06F 3/041; G06F 3/0414; G06F 2203/04102; G06F 2203/04106
See application file for complete search history.

(56) References Cited

U.S. PATENT DOCUMENTS

| | | | | |
|---|---|---|---|---|
| 2016/0188082 | A1* | 6/2016 | Ham | G06F 3/0416 |
| | | | | 345/174 |
| 2016/0195980 | A1* | 7/2016 | Liao | G06F 3/044 |
| | | | | 345/174 |
| 2016/0370908 | A1* | 12/2016 | Kim | G06F 3/044 |
| 2017/0242523 | A1* | 8/2017 | Hoch | G06F 3/0412 |

FOREIGN PATENT DOCUMENTS

| | | |
|---|---|---|
| CN | 204904241 U | 12/2015 |
| TW | 201508603 A | 3/2015 |

* cited by examiner

PRESSURE SENSING DISPLAY AND MANUFACTURING METHOD THEREOF

CROSS REFERENCE TO RELATED APPLICATIONS

This Non-provisional application claims priority under 35 U.S.C. § 119(a) on Patent Application No(s). 105104125 filed in Taiwan, Republic of China on Feb. 5, 2016, the entire contents of which are hereby incorporated by reference.

BACKGROUND

Technical Field

The present disclosure relates to a sensing display and a manufacturing method thereof, and in particular, to a pressure sensing display and a manufacturing method thereof.

Related Art

As the progress of technology, various kinds of information apparatuses are invented such as the mobile phone, tablet, UMPC, GPS, etc. Except for the general input devices such as the keyboard and mouse, the touch input device is one of the popular input devices. In practice, the touch device can provide a user-friendly and intuitive input interface, so that the users of different ages can easily operate the touch device by a finger or a stylus.

The 2D multi-touch technology is one of the popular touch technologies, and it can precisely determine the position pressed by finger according to the capacitance changes, thereby generating the corresponding control function. Besides, in order to sense the pressing in the Z-axis, which is perpendicular to the display surface, a pressure sensing structure is needed to achieve the goal of 3D touch control.

SUMMARY

The present disclosure discloses a pressure sensing display including a first substrate, a thin film transistor (TFT) array, a first sensing element, a second sensing element and a compressible layer. The first substrate has a first surface and a second surface, and the first surface is opposite to the second surface. The TFT array is disposed on the first surface. The first sensing element is disposed on the second surface. The second sensing element is disposed opposite to the first sensing element. The compressible layer is disposed between the first sensing element and the second sensing element.

The present disclosure also discloses a manufacturing method of a pressure sensing display. The manufacturing method includes the following steps of: providing a first substrate, wherein the first substrate has a first surface and a second surface, and the first surface is opposite to the second surface; forming a thin film transistor (TFT) array on the first surface; providing a second substrate, wherein the second substrate is disposed opposite to the first substrate, and the TFT array is disposed between the first substrate and the second substrate; forming a first sensing element on the second surface; providing a second sensing element, wherein the second sensing element and the first sensing element are located at the same side of the first substrate; and providing a compressible layer, wherein the compressible layer is disposed between the first sensing element and the second sensing element.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE PRESENT DISCLOSURE

The embodiments of the disclosure will be apparent from the following detailed description, which proceeds with reference to the accompanying drawings, wherein the same references relate to the same elements.

It should be noted that the expression "a layer overlying another layer", "a layer is disposed above another layer", "a layer is disposed on another layer", "a layer is disposed over another layer", and "a layer is formed on another layer" may indicate that the layer is in direct contact with the other layer, or that the layer is not in direct contact with the other layer, there being one or more intermediate layers disposed between the layer and the other layer.

It should be noted that the expression "a layer facing to the other layer" may indicate that the layer is directly facing to the other layer, or that the layer is not directly facing to the other layer, there being one or more intermediate layers disposed between the layer and the other layer.

Figure 1A:
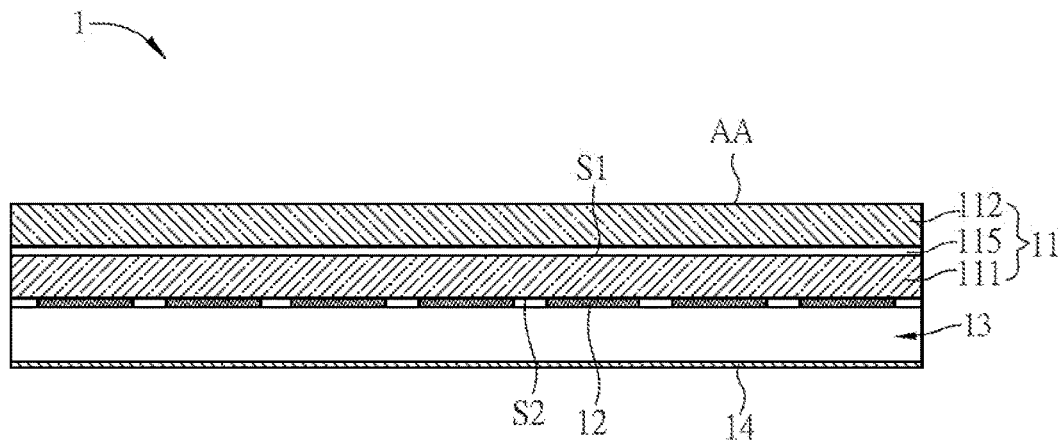
FIG. 1A is a schematic diagram showing a pressure sensing display according to an embodiment of the disclosure.
Figure 1B:
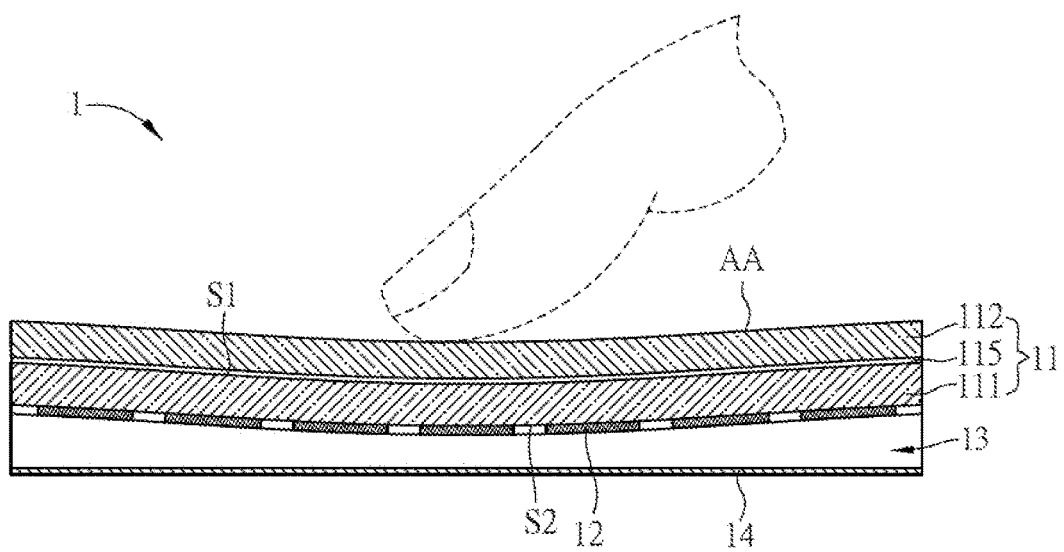
FIG. 1B is a schematic diagram showing the pressure sensing display under a pressing action.

FIG. 1A is a schematic diagram showing a pressure sensing display 1 according to an embodiment of the disclosure, and FIG. 1B is a schematic diagram showing the pressure sensing display 1 under a pressing action.

The pressure sensing display 1 includes a display panel 11, a first sensing element 12, a compressible layer 13, and a second sensing element 14.

The display panel 11 can be a liquid crystal display (LCD) panel, an organic light-emitting diode (OLED) panel, a light-emitting diode (LED) panel, or a quantum dot (QD) panel, and this disclosure is not limited.

The display panel 11 has a display surface AA and includes a first substrate 111 and a second substrate 112, which are disposed opposite to each other. The second substrate 112 can be a layer/film such as a polarizer, a barrier film, a capping layer, a filler, or an encapsulating layer. The first substrate 111 has a first surface S1 and a second surface S2. The second surface S2 is opposite to the first surface S1. The display surface AA is closer to the first surface S1 than the second surface S2. In this embodiment, the first surface S1 is the top surface of the first substrate 111, and the second surface S2 is the bottom surface of the first substrate 111.

The first sensing element 12 is disposed on the second surface S2 of the first substrate ill. In this embodiment, the first sensing element 12 is formed on the second surface S2 of the first substrate 111, and then the first substrate 111 is assembled with the second substrate 112. Otherwise, the first substrate 111 and the second substrate 112 are assembled, and then the first sensing element 12 is formed on the second surface S2 of the first substrate 111. However, this disclosure is not limited. In this embodiment, the first sensing element 12 is directly formed on the second surface S2 of the first substrate 111. In another embodiment, the first sensing element 12 is indirectly formed on the second surface S2 of the first substrate 111. For example, it is possible to insert additional film or layer between the first sensing element 12 and the second surface S2 of the first substrate 111 and the first sensing element 12 is formed on the additional film. And the additional film comprises PET, PI, PC, or the like. In this embodiment, the first sensing element 12 is formed on the second surface S2 of the first substrate 111 by a lithography process. In another embodiment, the first sensing element 12 is formed by a printing process or a coating process.

The second sensing element 14 is disposed on the compressible layer 13, and is located opposite to the first sensing element 12. The first sensing element 12 and the second sensing element 14 are located at the same side of the first substrate 111. The compressible layer 13 is located between the first sensing element 12 and the second sensing element 14. In other words, the second sensing element 14 is disposed at one side of the compressible layer 13 away from the first substrate 111. Before a pressing action, the first sensing element 12, the compressible layer 13 and the second sensing element 14 can form a capacitor with a certain capacitance value because of the configuration of the compressible layer 13 as a dielectric layer located between the first sensing element 12 and the second sensing element 14. In this case, a control circuit (not shown) of the pressure sensing display 1 respectively provides a first voltage and a second voltage to the first sensing element 12 and the second sensing element 14 so as to provide a voltage difference between the first sensing element 12 and the second sensing element 14. Accordingly, an initial capacitance value is generated between the first sensing element 12 and the second sensing element 14.

The capacitance value between the first sensing element 12 and the second sensing element 14 can be a self capacitance value or a mutual capacitance value. In one aspect, one of the first sensing element 12 and the second sensing element 14 is a patterned conductive layer, and the other one is a non-patterned conductive layer. According to this construction, the capacitance value between the first sensing element 12 and the second sensing element 14 is a self capacitance value. In another aspect, the first sensing element 12 and the second sensing element 14 are both patterned conductive layers, and they are misaligned as viewing from the top side (along the Z axis that is perpendicular to the display surface AA). In this construction, the capacitance value between the first sensing element 12 and the second sensing element 14 is a mutual capacitance value. In this embodiment, as shown in FIG. 1A, the first sensing element 12 is a patterned conductive layer, the second sensing element 14 is a non-patterned conductive layer, and the capacitance value between the first sensing element 12 and the second sensing element 14 is a self capacitance value.

In this embodiment, when the display panel 11 is a LCD panel, a display intermediate layer (not shown), such as a liquid crystal layer, is disposed between the first substrate 111 and the second substrate 112. Herein, the pressure sensing display 1 further includes a TFT array 115, which includes a plurality of TFTs (not shown). The TFTs can function as switch elements, which are formed on the first surface S1 of the first substrate 111 and disposed between the first substrate 111 and the second substrate 112. Accordingly, the first substrate 111 and the TFT array 115 can together form a TFT substrate. Besides, the second substrate 112 can be configured with a color filter (CF) array (not shown) so as to form a CF substrate. Moreover, a backlight module (not shown) is disposed opposite to the display panel 11, so that the first sensing element 12, the compressible layer 13 and the second sensing element 14 are disposed between the first substrate 111 and the backlight module. The detailed description of this aspect will be discussed in another embodiment. In this embodiment, the first sensing element 12 and the second sensing element 14 comprise indium-tin oxide (ITO). In another embodiment, the first sensing element 12 and the second sensing element 14 comprise transparent conductive materials such as indium-zinc oxide (IZO), aluminum-zinc oxide (AZO), CTO, $SnO_2$, GZO, IZTO, or zinc oxide (ZnO). In another embodiment, the first sensing element 12 and the second element 14 comprise metal or alloy such as aluminum (Al), copper (Cu), silver (Ag), gold (Au), titanium (Ti), molybdenum (Mo), or their combinations thereof. In further embodiment, the first sensing element 12 and the second element 14 comprise carbon nanotube or conductive polymer. This disclosure is not limited. The TFTs are directly or indirectly formed on the first surface S1 of the first substrate 111. It is possible to configure additional film or layer between the TFTs and the first surface S1. In this embodiment, the TFTs are formed on the first surface S1 by a lithography process. In another embodiment, the TFTs are formed on the second surface S2 of the first substrate 111 and electrically connected to plural pixel units on the first surface S1 of the first substrate 111 by a TGV (through glass via) process.

In another embodiment, the display panel 11 is an OLED display panel, the display intermediate layer is an OLED layer, and the first substrate 111 and the TFT array 115 can form a TFT substrate. When the OLED layer emits white light, the second substrate 112 is configured with a CF array so as to form a CF substrate. Otherwise, when the OLED layer emits the red light, green light, blue light and white light, the second substrate 112 can be a cover plate or a layer/film such as a polarizer, a barrier film, a capping layer, a filler, or an encapsulating layer for protecting the OLED layer from the external moist or dusts. In this embodiment, the first substrate 111 and the second substrate 112 comprise glass. In another embodiment, the first substrate 111 and the second substrate 112 comprise sapphire, ceramic, quartz, or plastic such as PET, PT, or PC.

In addition, the compressible layer 13 comprises insulation material including, for example, an optically clear adhesive (OCA), a liquid optically clear adhesive (LOCA), an optically clear resin (OCR), a SUPER VIEW resin (SVR), a silicon gel. Alternatively, the compressible layer 13 may include a sealing element and a gas layer (e.g. air), and the gas layer is disposed within a space defined by the sealing element (not shown). The thickness of the compressible layer 13 is for example between 50 μm and 1000 μm, between 100 μm and 500 μm, and between 150 μm and 250 μm. However, the thickness of the compressible layer 13 is not limited to the above exemplary ranges. In this embodiment, the compressible layer 13 is an optically clear adhesive (OCA), and the thickness thereof is about 250 μm.

As shown in FIG. 1B, when the display surface AA of the pressure sensing display 1 is pressed by a finger, the compressible layer 13 is deformed, so that the capacitance value between the first sensing element 12 and the second sensing element 14 is changed from the initial capacitance value to a pressed capacitance value. The control circuit of the pressure sensing display 1 can determine the position pressed by the finger and the pressing intensity according to the capacitance variations. In general, the greater the pressing force, the greater the capacitance variation. Then, the control circuit can generate the corresponding control function according to the determined pressing intensity. For example, the control circuit predetermines a second threshold value greater than a first threshold value. When the pressing intensity is greater than the first threshold value and smaller than the second threshold value, the corresponding control function is a selection function. When the pressing intensity is greater than the second threshold value, the corresponding control function is an execution function. The designer can design different function corresponding to different pressing intensities based on the actual requirements. Besides, the control circuit for determining the variation of the pressed and initial capacitance values (or a pressure sensing signal) can be an independent IC or be integrated in the driving IC of the display panel 11. This disclosure is not limited.

Figure 2A:
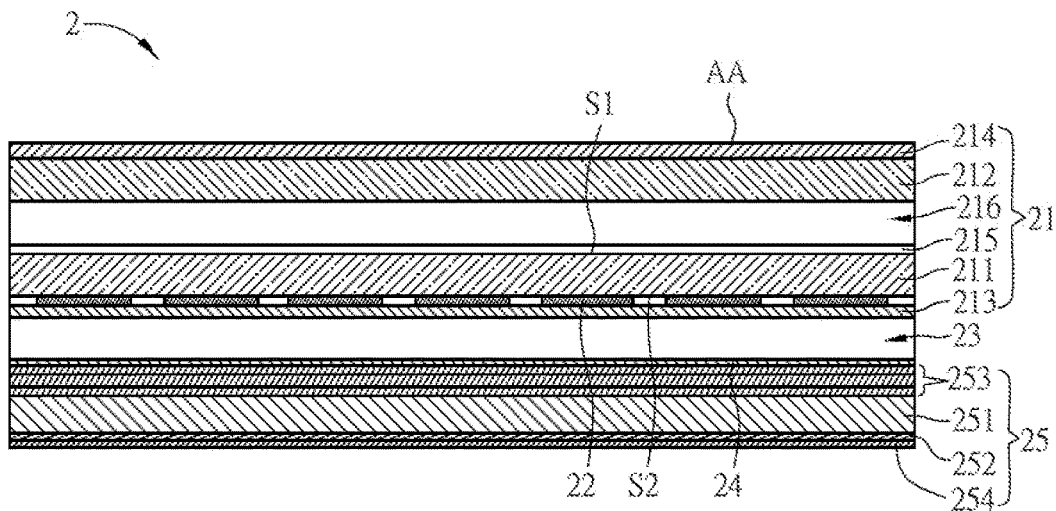
FIG. 2A is a schematic diagram showing a pressure sensing display according to another embodiment of the disclosure.
Figure 2B:
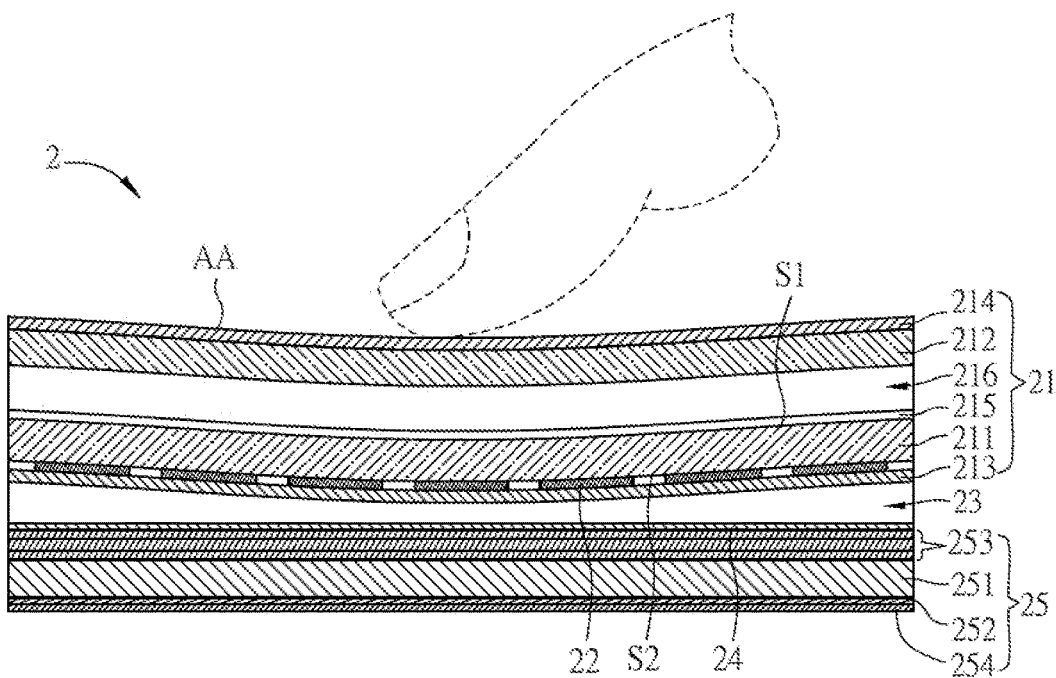
FIG. 2B is a schematic diagram showing the pressure sensing display of FIG. 2A under a pressing action.

FIG. 2A is a schematic diagram showing a pressure sensing display 2 according to another embodiment of the disclosure, and FIG. 2B is a schematic diagram showing the pressure sensing display 2 of FIG. 2A under a pressing action.

The pressure sensing display 2 includes a display panel 21, a first sensing element 22, a compressible layer 23, and a second sensing element 24. The display panel 21 is a LCD panel, so the pressure sensing display 2 further includes a backlight module 25.

The display panel 21 has a display surface AA and includes a first substrate 211, a second substrate 212 and a display intermediate layer 216. The first substrate 211 and the second substrate 212 are disposed opposite to each other, and the display intermediate layer 216 is disposed between the first substrate 211 and the second substrate 212. In this case, the display intermediate layer 216 is a liquid crystal layer. The first substrate 211 and the second substrate 212 comprise transparent material such as a glass substrate, a sapphire substrate, a ceramic substrate, a quartz substrate or a plastic substrate such as PI, PET, or PC, and this disclosure is not limited.

The first substrate 211 has a first surface S1 closing to the display surface AA, and a second surface S2 opposite to the first surface S1. In this embodiment, the first surface S1 is the top surface of the first substrate 211, and the second surface S2 is the bottom surface of the first substrate 211. The second substrate 212 is facing to the first surface S1. In addition, the pressure sensing display 2 further includes a TFT array 215, which includes a plurality of TFTs (not shown). The TFTs can function as switch elements, which are formed on the first surface S1 of the first substrate 211. Accordingly, the first substrate 211 and the TFT array 215 can together form a TFT substrate. Besides, the second substrate 212 can be configured with a color filter (CF) array (not shown) so as to form a CF substrate. In another aspect, at least one of the black matrix and the filter layer of the CF substrate can be formed on the first substrate 211, so that the first substrate 211 becomes a BOA (BM on array) substrate or a COA (color filter on array) substrate. This disclosure is not limited.

In this embodiment, the display panel 21 further includes a first polarizer 213 and a second polarizer 214. The first polarizer 213 is a lower polarizer, and the second polarizer 214 is an upper polarizer. The first polarizer 213 (the lower polarizer) is disposed at one side of the first substrate 211 away from the second substrate 212, and the second polarizer 214 (the upper polarizer) is disposed at one side of the second substrate 212 away from the first substrate 211. Herein, the first polarizer 213 is disposed between the first sensing element 22 and the second sensing element 24, and the second polarizer 214 is disposed on the upper surface of the second substrate 212.

The first sensing element 22 is disposed on the second surface S2 of the first substrate 211. In this embodiment, the first sensing element 22 is formed on the second surface S2 of the first substrate 211. Afterward, the first substrate 211 is assembled with the display intermediate layer 216 and the second substrate 212. Otherwise, the first substrate 211, the display intermediate layer 216 and the second substrate 212 are assembled. Afterward, the first sensing element 22 is formed on the second surface S2 of the first substrate 211. This disclosure is not limited.

The second sensing element 24 is disposed on the compressible layer 23, and is located opposite to the first sensing element 22. The first sensing element 22 and the second sensing element 24 are located at the same side (the lower side) of the first substrate 211. The compressible layer 23 is located between the first sensing element 22 and the second sensing element 24. In this embodiment, the compressible layer 23 is an optically clear adhesive (OCA). Before a pressing action, the sensing element 22, the compressible layer 23 and the second sensing element 24 can form a capacitor with a certain capacitance value because of the configuration of the compressible layer 23 as a dielectric layer located between the first sensing element 22 and the second sensing element 24. In this case, a control circuit (not shown) of the pressure sensing display 2 respectively provides a first voltage and a second voltage to the first sensing element 22 and the second sensing element 24 so as to provide a voltage difference between the first sensing element 22 and the second sensing element 24. Accordingly, an initial capacitance value is generated between the first sensing element 22 and the second sensing element 24.

The capacitance value between the first sensing element 22 and the second sensing element 24 can be a self capacitance value or a mutual capacitance value. In this embodiment, the first sensing element 22 is a patterned conductive layer, and the second sensing element 24 is a non-patterned conductive layer. According to this construction, the capacitance value between the first sensing element 22 and the second sensing element 24 is a self capacitance value. In another aspect, the first sensing element 22 and the second sensing element 24 are both patterned conductive layers, and they are misaligned as viewing from the top side (along the Z axis that is perpendicular to the display surface AA). In this construction, the capacitance value between the first sensing element 22 and the second sensing element 24 is a mutual capacitance value. In this embodiment, the first sensing element 22 and the second sensing element 24 are transparent conductive films.

The backlight module 25 is disposed opposite to the first substrate 211 of the display panel 21, and is disposed at one side of the compressible layer 23 away from the first sensing element 22. The light emitted from the backlight module 25 enters the display panel 21, so that the display panel 21 can display images. In this embodiment, the backlight module 25 is an edge-type which includes a light guiding plate 251, a reflective plate 252, a plurality of optical sheets 253, and a back plate 254. The back plate 254 supports the light guiding plate 251, the reflective plate 252, and the optical sheets 253 for protecting them from impactions, electromagnetic waves, or electric shocks. The back plate 254 can comprise plastics, metals or alloys, and this disclosure is not limited. The optical sheets 253 and the reflective plate 252 are disposed at two sides of the light guiding plate 251. In addition, this embodiment includes three optical sheets 253, which include, for example but not limited to, light collectors, diffusers, or a quantum dot film. In another embodiment, the number of the optical sheets 253 is less or more than three. In another embodiment, the backlight module is a direct-type and the light guiding plate can be omitted. The detailed descriptions of the relations and functions of the backlight module 25 and the display panel 21 are omitted.

The second sensing element 24 is disposed on the optical sheets 253 of the backlight module 25, disposed between the optical sheets 253 of the backlight module 25, or disposed on the light guiding plate 251. In this embodiment, the second sensing element 24 is disposed on the optical sheet 253, which is closer to the compressible layer 23. In another embodiment, the second sensing element 24 is formed on a transparent substrate. The transparent substrate is then disposed on the optical sheet 253. This disclosure is not limited.

As shown in FIG. 2B, when the display surface AA of the pressure sensing display 2 is pressed by a finger, the compressible layer 23 is deformed. The capacitance value between the first sensing element 22 and the second sensing element 24 is changed from the initial capacitance value to a pressed capacitance value. The control circuit of the pressure sensing display 2 can determine the position pressed by the finger and the pressing intensity according to the capacitance variations. The capacitance variation may indicate the difference between the initial capacitance value and the pressed capacitance value. In general, the greater the pressing force, the greater the capacitance variation. Then, the control circuit can generate the corresponding control function according to the determined pressing intensity. For example, the control circuit predetermines a second threshold value greater than a first threshold value. When the pressing intensity is greater than the first threshold value and is smaller than the second threshold value, the corresponding control function is a selection function. When the pressing intensity is greater than the second threshold value, the corresponding control function is an execution function. The designer can design different function corresponding to different pressing intensities based on the actual requirements. Besides, the control circuit for determining the variation of the pressed and initial capacitance values (or a pressure sensing signal) can be an independent IC or be integrated in the driving IC of the display panel 21. This disclosure is not limited.

To be noted, in another aspect, if the reflective plate 252 includes a conductive metal film or the back plate 254 comprises conductive metal or alloy, the conductive reflective plate 252 or the conductive back plate 254 can be used as the second sensing element 24, so it is unnecessary to configure the additional second sensing element 24.

FIGS. 3A to 3D are schematic diagrams showing the pressure sensing displays 2a to 2d of different aspects of the disclosure.

Figure 3A:
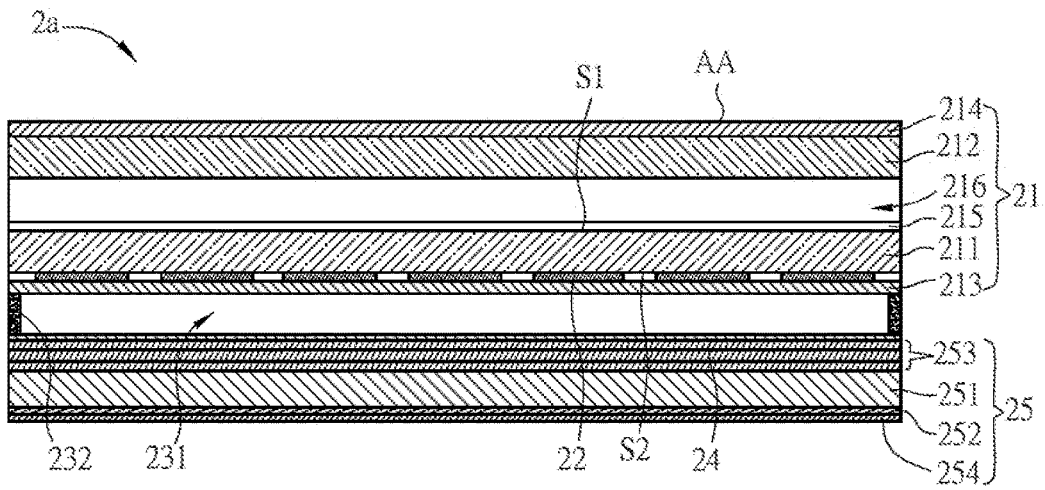
FIGS. 3A to 3D are schematic diagrams showing the pressure sensing displays of different aspects of the disclosure.

Different from the pressure sensing display 2 of FIG. 2A, the compressible layer 23 of the pressure sensing display 2a of FIG. 3A includes a gas layer 231 (e.g. air) and a sealing element 232. The sealing element 232 is disposed around the polarizer 213 and the backlight module 25, and the gas layer 231 is disposed within a space defined by the sealing element 232, the display panel 21 and the second sensing element 24. In this embodiment, the sealing element 232 comprises, for example but not limited to, the same material of the sealing material for sealing the display intermediate layer, such as sealant. In another embodiment, the sealing element 232 comprises frit, epoxy resin, inorganic/organic/inorganic layer, metallic material, or other organic or inorganic polymers.

Figure 3B:
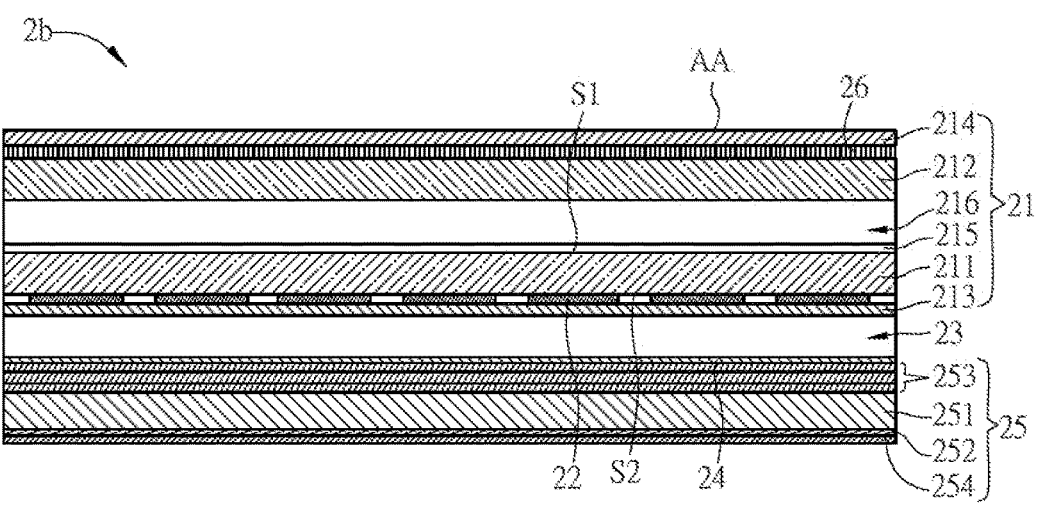

Different from the pressure sensing display 2 of FIG. 2A, the pressure sensing display 2b of FIG. 3B further includes a touch electrode layer 26. The touch electrode layer 26 can comprise a transparent conductive material, such as ITO, IZO, AZO, CTO, $SnO_2$, GZO, IZTO, or ZnO. The touch electrode layer 26 is disposed between the second substrate 212 and the polarizer 214. The pressure sensing display 2b is an on-cell touch control display. In another embodiment, the display intermediate layer is one of OLED, QLED, or LED. The second substrate 212 can be replaced by a layer/film such as a polarizer, a barrier film, a capping layer, a filler, or an encapsulating layer and the backlight module 25 can be omitted. And the touch electrode layer 26 is disposed on the second substrate 212.

Figure 3C:
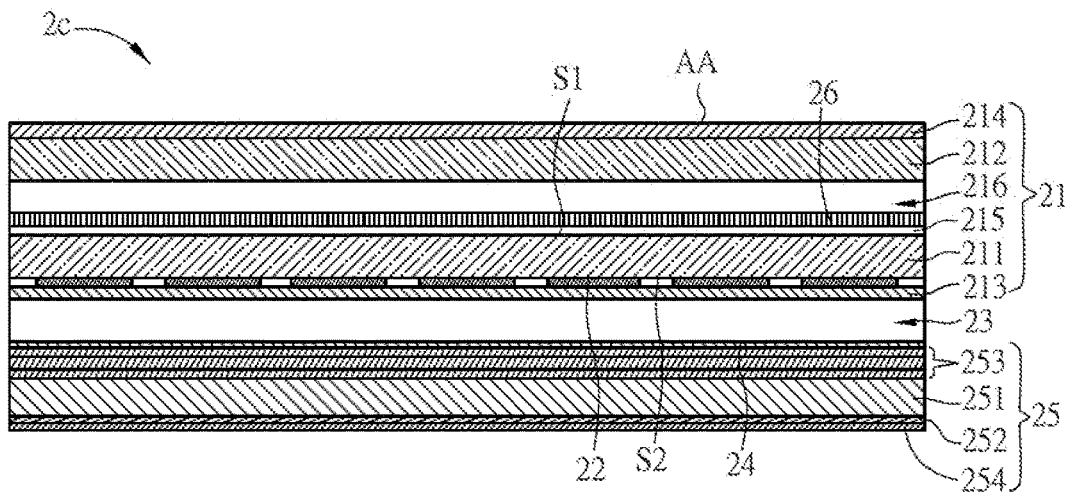

Different from the pressure sensing display 2 of FIG. 2A, the pressure sensing display 2c of FIG. 3C further includes a touch electrode layer 26. The touch electrode layer 26 can comprise a transparent conductive material, such as ITO, IZO, AZO, CTO, $SnO_2$, GZO, IZTO, or ZnO. The touch electrode layer 26 is disposed between the first substrate 211 and the second substrate 212. In this aspect, the touch electrode layer 26 is disposed on the second surface S2 of the first substrate 211, and is disposed between the TFT array 215 and the second substrate 212. Accordingly, the pressure sensing display 2c is an in-cell touch control display. Besides, the touch electrode layer 26 can be either electrically connected to the TFT array 215 or not. In another embodiment, the touch electrode layer 26 can be made by one of the metal layers of the TFT array 215. The configuration is optionally selected depending on the desired touch structure.

Figure 3D:
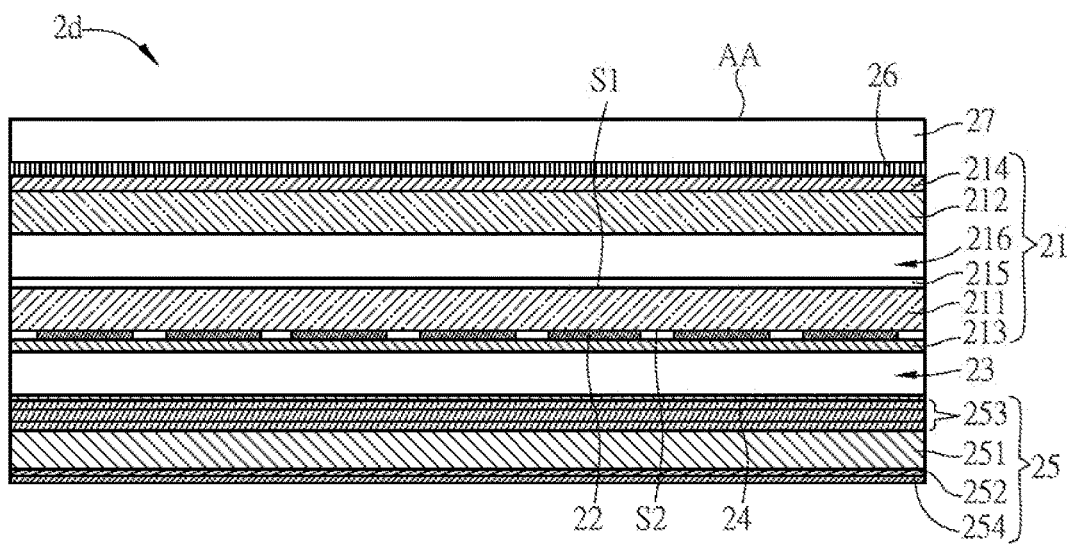

Different from the pressure sensing display 2b of FIG. 3B, the pressure sensing display 2d of FIG. 3D further includes a cover plate 27, which is disposed at one side of the second substrate 212 away from the first substrate 211. The touch electrode layer 26 is disposed on a surface of the cover plate 27 facing the second substrate 212 of the display panel 21. In this case, the pressure sensing display 2d is an OGS (one glass solution) touch control display. In another embodiment, it is possible to configure a cover plate 27 in the pressure sensing display 2, 2a, 2b or 2c for protecting the pressure sensing display 2, 2a, 2b or 2c from the external moist and dusts.

The other technical features of the pressure sensing displays 2a to 2d can be referred to the same components of the pressure sensing display 2, so the detailed description thereof will be omitted.

Accordingly, in the pressure sensing displays 2a to 2d, the configuration of the touch electrode layer 26 in cooperating with the function of the compressible layer 13 for sensing the pressure sensing signal can achieve the 3D touch control function, thereby improving the utility of the products with the provided touch control function.

Figure 4:
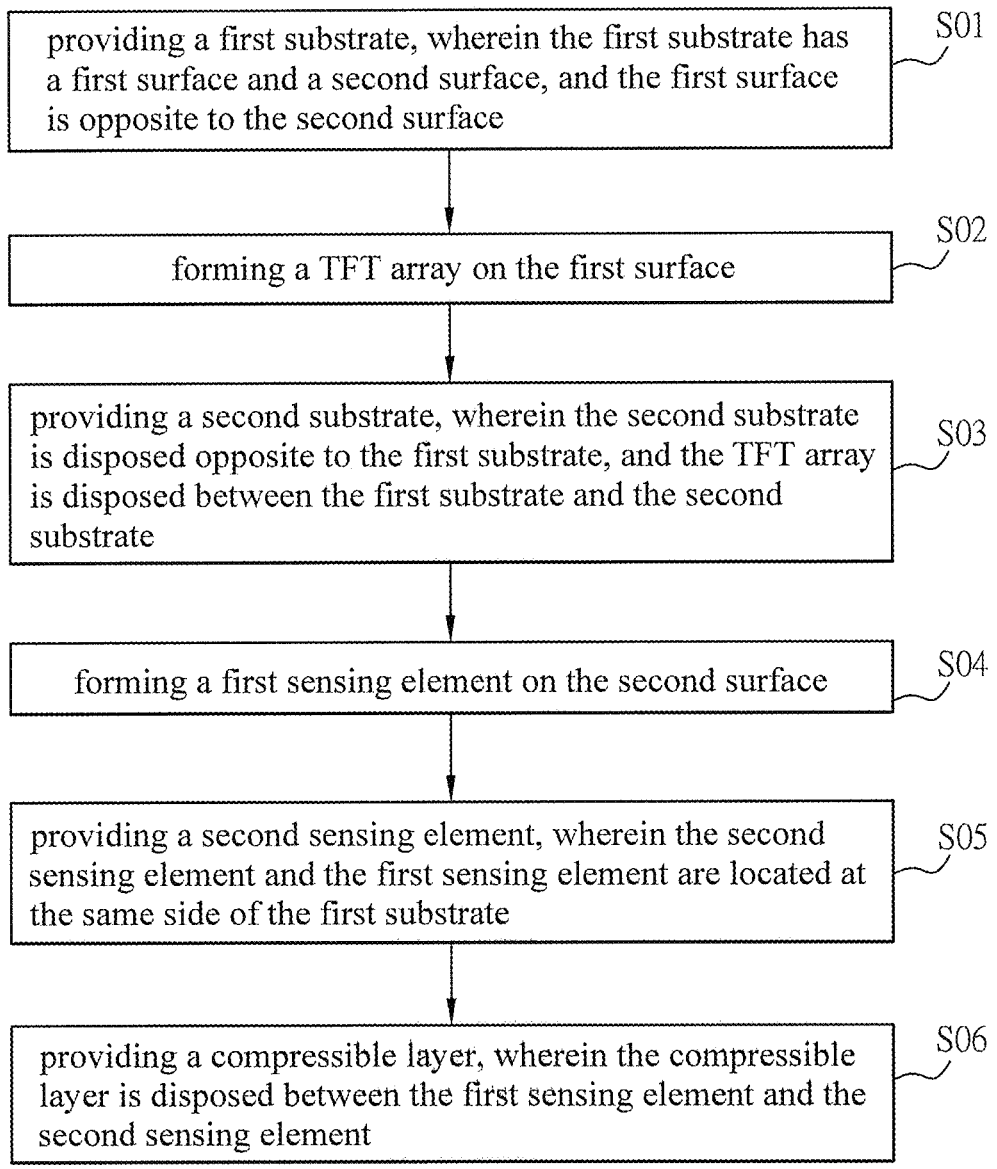
FIG. 4 is a flow chart of a manufacturing method of the pressure sensing display according to the embodiment of the disclosure.

FIG. 4 is a flow chart of a manufacturing method of the pressure sensing display according to the embodiment of the disclosure. The manufacturing method of the pressure sensing display will be described with reference to FIG. 4 in view of FIGS. 2A and 3B to 3D. To be noted, the technical features, variations and aspects of the pressure sensing displays 2 and 2b to 2d have been described in the above embodiments, so the details thereof will be omitted.

As shown in FIG. 4, the manufacturing method of the pressure sensing display includes the following steps S01 to S06.

With reference to FIG. 2A, the step S01 is to provide a first substrate 211, wherein the first substrate 211 has a first surface S1 and a second surface S2, and then the step S02 is to form a thin film transistor (TFT) array on the first surface S1. Herein, the first surface S1 is opposite to the second surface S2, and the TFT array 215 includes a plurality of TFTs. Next, the step S03 is to provide a second substrate 212. Herein, the second substrate 212 is disposed opposite to the first substrate 211, and the TFT is disposed between the first substrate 211 and the second substrate 212. In addition, a display intermediate layer 216 is disposed between the first substrate 211 and the second substrate 212. Afterwards, the step S04 is to form a first sensing element 22 on the second surface S2.

In another embodiment, the first sensing element 22 is formed on the second surface S2 of the first substrate 211 before the step S03 for providing the second substrate 212. In this embodiment, the first sensing element 22 is formed on the second surface S2 of the first substrate 211 after the step S03 for providing the second substrate 212. In other words, the first sensing element 22 can be formed on the second surface S2 of the first substrate 211 before or after the assembling procedure of the first substrate 211 and the second substrate 212.

Then, the step S05 is to provide a second sensing element 24, wherein the second sensing element 24 is disposed at one side of the first sensing element 22 away from the first substrate 211. Next, the step S06 is to provide a compressible layer 23, wherein the compressible layer 23 is disposed between the first sensing element 22 and the second sensing element 24. Before the step of providing the compressible layer 23 between the first sensing element 22 and the second sensing element 24 (step S06), the manufacturing method further includes the following steps of: providing a first polarizer 213 and a second polarizer 214; disposing the first polarizer 213 at one side of the first sensing element 22 away from the first substrate 211; and disposing the second polarizer 214 at one side of the second substrate 212 away from the first substrate 211.

In addition, the manufacturing method further includes the following steps of: providing a backlight module 25, which includes a light guiding plate 251, a reflective plate 252, at least one optical sheet 253, and a back plate 254, wherein the optical sheet 253 and the reflective plate 252 are disposed at two sides of the light guiding plate 251, and the back plate 254 supports the reflective plate 252, the light guiding plate 251 and the optical sheet 253; and disposing the backlight module 25 opposite to the first substrate 211 of the display panel 21, and disposing the compressible layer 23 between the first sensing element 22 and the backlight module 25. In this embodiment, the second sensing element 24 is a transparent conductive film disposed on the light guiding plate 251, and at least one optical sheet 253 is disposed between the second sensing element 24 and the light guiding plate 251. In another embodiment, the second sensing element 24 is a transparent conductive film and is directly disposed on the light guiding plate 251, and at least one optical sheet 253 is disposed on the second sensing element 24. In another embodiment, the conductive reflective plate 252 or the conductive back plate 254 can function as the second sensing element 24, so the additional second sensing element 24 is not needed.

In the embodiment, as shown in FIG. 3B, the manufacturing method further includes a step of disposing a touch electrode layer 26 between the second substrate 212 and the second polarizer 214. In the embodiment, as shown in FIG. 3C, the manufacturing method further includes a step of disposing a touch electrode layer 26 between the first substrate 211 and the second substrate 212, wherein the touch electrode layer 26 is disposed on the TFT. In the embodiment, as shown in FIG. 3D, the manufacturing method further includes the following steps of: providing a touch electrode layer 26 and a cover plate 27 (a protection glass); disposing the touch electrode layer 26 on a surface of the cover plate 27 facing the second substrate 212; and disposing the cover plate 27 opposite to the second substrate 212.

The other technical features of the manufacturing method of the pressure sensing display can be referred to the same components of the pressure sensing displays 2 and 2a to 2d, so the detailed description thereof will be omitted.

To sum up, in the pressure sensing display and the manufacturing method thereof, the TFT is formed on the first surface of the first substrate, and the first sensing element is disposed on the second surface of the first substrate. The second sensing element is disposed opposite to the first sensing element, and they are located at the same side of the first substrate. The compressible layer is disposed between the first sensing element and the second sensing element. Accordingly, when the pressure sensing display of the disclosure is pressed, the compressible layer is deformed so that the capacitance value between the first and second sensing elements is changed. Then, the pressure sensing display can determine the position and intensity of the pressing action according to the capacitance variation, and then generate various control functions based on the pressing intensities. In addition, the pressure sensing display can cooperate with the conventional 2D touch control technology to achieve a 3D touch control function, thereby improving the utility of the products with the provided touch control function.

The disclosure has described several embodiments and the technical features described in those embodiments can be picked, selected, and mixed to form another embodiment. For example, the technical features described in pressure sensing display 2a can also applied to another pressure sensing display 2b, 2c, or 2d.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A pressure sensing display, comprising:
    a first substrate having a first surface and a second surface, wherein the first surface is opposite to the second surface;
    a thin film transistor (TFT) array disposed on the first surface;
    a second substrate disposed opposite to the first substrate, wherein the TFT array is disposed between the first substrate and the second substrate;
    a first sensing element disposed on the second surface;
    a second sensing element disposed opposite to the first sensing element, wherein the second sensing element and the first sensing element are located at the same side of the first substrate; and
    a compressible layer disposed between the first sensing element and the second sensing element.

2. The pressure sensing display of claim 1, wherein one of the first sensing element and the second sensing element is a patterned conductive layer.

3. The pressure sensing display of claim 1, wherein the first sensing element and the second sensing element are patterned conductive layers.

4. The pressure sensing display of claim 1, wherein the compressible layer comprises an optically clear adhesive (OCA), a liquid optically clear adhesive (LOCA), an optically clear resin (OCR), or a silicon gel.

5. The pressure sensing display of claim 1, further comprising:
a first polarizer and a second polarizer, wherein the first polarizer is disposed between the first sensing element and the second sensing element, and the second polarizer is disposed at one side of the second substrate away from the first substrate.

6. The pressure sensing display of claim 5, further comprising:
a touch electrode layer disposed between the second substrate and the second polarizer.

7. The pressure sensing display of claim 1, further comprising:
a touch electrode layer disposed between the TFT array and the second substrate.

8. The pressure sensing display of claim 1, further comprising:
a cover plate disposed at one side of the second substrate away from the first substrate; and
a touch electrode layer disposed on a surface of the cover plate.

9. The pressure sensing display of claim 1, further comprising:
a backlight module disposed opposite to the first substrate, wherein the backlight module is disposed at one side of the compressible layer away from the first sensing element, the backlight module comprises a light guiding plate, a reflective plate, an optical sheet, and a back plate, the optical sheet and the reflective plate are disposed at two sides of the light guiding plate, and the back plate supports the reflective plate, the light guiding plate and the optical sheet.

10. The pressure sensing display of claim 9, wherein the second sensing element is a conductive film disposed on the light guiding plate.

11. The pressure sensing display of claim 9, wherein the second sensing element is the reflective plate or the back plate.

12. A manufacturing method of a pressure sensing display, comprising steps of:
providing a first substrate, wherein the first substrate has a first surface and a second surface, and the first surface is opposite to the second surface;
forming a thin film transistor (TFT) array on the first surface;
providing a second substrate, wherein the second substrate is disposed opposite to the first substrate, and the TFT array is disposed between the first substrate and the second substrate;
forming a first sensing element on the second surface;
providing a second sensing element, wherein the second sensing element and the first sensing element are located at the same side of the first substrate; and
providing a compressible layer, wherein the compressible layer is disposed between the first sensing element and the second sensing element.

13. The manufacturing method of claim 12, wherein the first sensing element is formed on the second surface of the first substrate after the step of providing the second substrate.

14. The manufacturing method of claim 12, wherein the first sensing element is formed on the second surface of the first substrate before the step of providing the second substrate.

15. The manufacturing method of claim 12, further comprising a step of:
providing a touch electrode layer, wherein the touch electrode layer is disposed between the TFT array and the first substrate.

16. The manufacturing method of claim 12, further comprising steps of:
providing a touch electrode layer and a cover plate;
disposing the touch electrode layer on a surface of the cover plate; and
disposing the cover plate opposite to the second substrate.

17. The manufacturing method of claim 12, wherein before the step of providing the compressible layer between the first sensing element and the second sensing element, the manufacturing method further comprises steps of:
providing a first polarizer and a second polarizer;
disposing the first sensing element between the first polarizer and the first substrate; and
disposing the second polarizer at one side of the second substrate away from the first substrate.

18. The manufacturing method of claim 17, further comprising a step of:
providing a touch electrode layer, wherein the touch electrode layer is disposed between the second substrate and the second polarizer.

19. The manufacturing method of claim 12, further comprising steps of:
providing a backlight module, wherein the backlight module comprises a light guiding plate, a reflective plate, an optical sheet, and a back plate, the optical sheet and the reflective plate are disposed at two sides of the light guiding plate, and the back plate supports the reflective plate, the light guiding plate and the optical sheet; and
disposing the backlight module opposite to the first substrate, wherein the compressible layer is disposed between the first sensing element and the backlight module.

* * * * *